C. LE G. FORTESCUE.
ELECTRICAL MEASURING DEVICE.
APPLICATION FILED OCT. 31, 1913.
1,186,765.
Patented June 13, 1916.
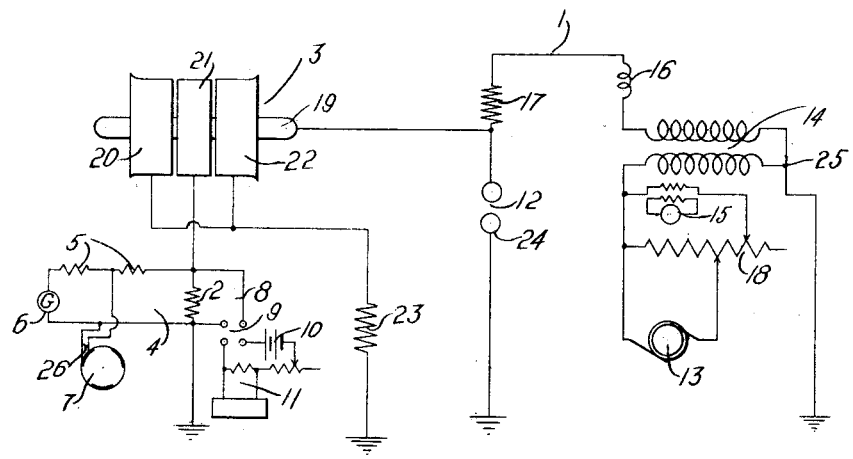

UNITED STATES PATENT OFFICE.

CHARLES LE G. FORTESCUE, OF PITTSBURGH, PENNSYLVANIA, ASSIGNOR TO WESTINGHOUSE ELECTRIC AND MANUFACTURING COMPANY, A CORPORATION OF PENNSYLVANIA.

ELECTRICAL MEASURING DEVICE.

1,186,765.  Specification of Letters Patent.  Patented June 13, 1916.

Application filed October 31, 1913. Serial No. 798,529.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in Electrical Measuring Devices, of which the following is a specification.

My invention relates to electrical measuring systems and particularly to methods of measuring voltages.

The object of my invention is to provide a method of measuring the maximum value of the voltage of a circuit.

Various methods have been proposed for measuring high-tension voltages, the most usual methods being to measure the low-tension voltage of a main transformer and to multiply this value by the ratio of transformation, to use a voltage transformer and to use an electrostatic voltmeter. The first method gives results very much in error, on account of the distributed capacity in the high-tension winding of the transformer, harmonic distortions of the applied voltage wave, and the capacity of the terminal bushings and the apparatus to which the high-voltage winding is connected. Furthermore, unless the wave is a pure sine wave there is no method of getting the maximum voltage. The second method is an improvement over the first method but requires corrections in most cases and is expensive because it requires the use of another transformer. The third method corrects the reactive errors of the ratio method but gives also an effective reading and does not indicate the wave shape or the maximum value of the voltage.

Recently, sphere gaps have been proposed for the measurement of high voltage on account of the fact that the rupture of a given sphere gap is independent of frequency and of time of voltage application, and that it depends only upon the maximum value of the impressed voltage provided there is no ionization before the air breaks down and there is no corona at the surface of the spheres. As a sphere gap will not indicate the voltage of a circuit below a definite maximum value, I have provided a method of indicating the maximum value of the voltage at any time, irrespective of any change in the shape of the voltage wave. My invention may be used however, to calibrate a sphere gap for operation at definite maximum voltages.

The single figure of the accompanying drawing is a diagrammatic view of an electrical circuit used in calibrating a sphere gap by a method embodying my invention.

In order to determine the maximum value of the voltage of a circuit 1, I provide means for measuring the average value of the voltage drop across a non-inductive resistor 2 through which is transmitted the charging current of a condenser 3 that is connected across the conductors of the circuit 1, the voltage of which is to be measured. I provide an auxiliary circuit 4 comprising resistors 5, a galvanometer 6 and a contact making and breaking device 7 for determining the average value of the potential drop across the resistor which is proportional to the condenser current. I provide also a circuit 8 which is connected in shunt across the resistor 2, comprising a switch 9, a battery 10 and a potentiometer 11 which is used to calibrate the galvanometer 6.

One application to which my method may be applied, as hereinafter stated, is to calibrate a sphere gap 12, for which I provide a generator 13 supplying current to an auto testing transformer 14, a voltmeter 15, a choke coil 16, damping resistor 17 and a control resistor 18.

The condenser 3, as shown, is an air condenser and is constructed of wood carefully turned to dimensions and coated with tin foil and lead sheeting. The central high-voltage member 19 is suspended within three sections 20, 21 and 22, the outer two of which are connected together and connected to ground through a resistor 23. The central member 21 is connected through the resistor 2 to ground, as is terminal 24 of the sphere gap 12 and terminal 25 of the transformer 14.

When the voltage is impressed across the sphere gap 12, the condenser 3 will take a quantity of electricity to charge it which is proportional to the maximum value of the impressed voltage and the capacity of the condenser, and, since the quantity of electricity is proportional to the time and current, the following formula is correct for waves having odd harmonics.

$$I = 4CVF$$

where I = average value of the condenser current.
C = capacity of the condenser.
F = frequency of the voltage wave.
V = maximum voltage.

Hence, if the average value of the condenser current, the capacity of the condenser and the frequency of the voltage wave are known, we have a measure of the maximum voltage.

If the galvanometer 6 is critically damped to obtain quick readings and to eliminate the errors due to swinging which would occur with voltage variation and phase shifts, it can be assumed that a steady deflection ($d$) of the galvanometer is proportional to the product of a constant ($k$) and the average value of the condenser current ($I$) or $d = KI$. Hence $$V = \frac{d}{4CKF}$$

The constant $k$ of the galvanometer may be read from a calibration chart, if it is different for various deflections of the galvanometer, but, in order to determine the constant $k$ when it remains the same for various deflections of the galvanometer, the switch 9 is closed and the contact device 7 started, and, for various values of the voltage impressed across the resistor 2 measured by the potentiometer 11, the deflection ($d$) is noted. The potential drop across the resistor 2 is proportional to the average value of the current and the constant ($k$) is the number of divisions of deflection ($d$) per ampere. It must be borne in mind that the galvanometer reading will be only one half the value of the potentiometer reading, since the contact device 7 is arranged for either short-circuiting the galvanometer 6 every alternate half cycle, or for removing the galvanometer from the circuit every alternate half cycle, and is driven by some form of motor (not shown). However, the galvanometer may be reversed every half cycle by the device 7, in which case it will indicate the same values as the potentiometer. The brushes 26 are so adjusted as to operate at the correct point on the voltage wave.

The outer plates of the condenser are connected to resistors so adjusted that the time constants of the center and ends of the condenser will be approximately the same, and, since the parts are all grounded, there will be no leakage from one section to the other.

The guard rings 20 and 24 are provided to distribute the dielectric forces uniformly over the entire surface of the inner ring 21.

The voltage may be varied by the controlling resistor, and various charging currents will be taken by the condenser, then, knowing that the drop across the resistor 2 is proportional to the charging current and that $$V = \frac{d}{4CKF}$$

the deflection is noted and, since the capacity of the condenser, the frequency of the voltage wave and the constant of the galvanometer have been determined previously, the maximum voltage may be calculated directly.

While I have set forth a method of measuring the maximum value of the voltage used in calibrating a sphere gap, my invention may be used for measuring the maximum value of the voltage for any other purpose. Various methods of regulating the contacting device and various forms of condensers may be used within the scope of the appended claims.

I claim as my invention:

1. A device for measuring the maximum value of a voltage wave comprising means for charging a condenser with the voltage to be measured, and means for determining the mean value of the charging current of said condenser for half wave intervals of time.

2. A method of measuring the maximum value of a voltage wave consisting in first charging a condenser with the voltage to be measured, then measuring the average value of the condenser current for each half cycle of the wave and then computing the maximum value of the voltage, knowing the capacity of the condenser and the frequency of the wave.

3. A method of measuring the maximum value of a voltage wave consisting, first of charging a condenser from the circuit the voltage of which is to be measured, then sending the charging current through a resistor, then measuring the deflection of a galvanometer, said galvanometer being connected in shunt to the said resistor and computing the maximum value of the voltage, knowing the capacity of the condenser, the frequency of the circuit, and the deflection constants of the galvanometer.

4. A method of computing the maximum value of a voltage wave consisting in first charging a condenser with the voltage to be measured, then measuring the average value of the condenser current, and then computing the maximum value of the voltage, knowing the capacity of the condenser and the frequency of the wave.

5. A method of measuring the maximum value of a voltage wave consisting in connecting a condenser across the circuit the maximum value of the voltage wave of which is to be measured, then sending the charging current through a resistor, then connecting a galvanometer across said resistor and short circuiting the current from the galvanometer, except every alternate half cycle, then computing the maximum value of the voltage wave, knowing that said maximum value of the voltage wave is directly proportional to the deflection of the galvanometer and inversely proportional to the capacity of the condenser, the frequency of the voltage wave, the constant of the galvanometer in divisions per ampere and a constant four.

6. A device for measuring the maximum value of the voltage of a circuit comprising a condenser connected across the circuit, a resistor in series with the condenser, a galvanometer in shunt relation to the resistor and means connected between the galvanometer and the resistor for short circuiting the said galvanometer under predetermined conditions.

7. A device for measuring the maximum value of the voltage of a circuit comprising a condenser connected across the circuit, a resistor in series with the condenser, a galvanometer in shunt relation to the resistor and means connected between the galvanometer and the resistor for rectifying the current that traverses the galvanometer.

8. A device for determining the voltage of an electric circuit comprising a condenser connected across the said circuit and means for determining the value of the charging current of the condenser.

9. The method of determining the maximum value of a voltage wave consisting in measuring the average value of the charging current of a condenser operatively connected to a circuit upon which the voltage wave is impressed and then computing the maximum value of the voltage wave, knowing the constants of the circuit.

10. The method of measuring the maximum value of a voltage wave consisting in charging a condenser with the voltage to be measured, then measuring the average value of the condenser current and then computing the maximum value of the voltage, knowing the capacity of the condenser and the frequency of the wave.

11. The method of measuring the maximum value of a voltage wave consisting in charging a condenser from the circuit the voltage of which is to be measured, then sending the charging current through a resistor, then measuring the deflection of a galvanometer that is connected in shunt relation to the resistor and computing the maximum value of the voltage.

12. The method of measuring the maximum value of a voltage wave consisting in charging a condenser with the voltage to be measured, then measuring the mean value of the charging current of the condenser.

13. A voltage-measuring device comprising a condenser that is supplied with current proportional to the voltage to be measured, a measuring instrument and means connected between the measuring instrument and the condenser for rectifying the current that traverses the measuring instrument.

14. A voltage-measuring device comprising a condenser that is supplied with current proportional to the voltage to be measured, an electro-responsive device connected to the said condenser and means for rectifying the current that traverses the electro-responsive device.

15. A device for measuring the maximum value of a voltage wave comprising a condenser supplied with current proportional to the voltage to be measured, a galvanometer and a rectifier connected between the galvanometer and the condenser.

In testimony whereof, I have hereunto subscribed my name this 22nd day of Oct. 1913.

CHARLES LE G. FORTESCUE.

Witnesses:
 WALTER M. DANN,
 B. B. HINES.